(12) United States Patent
Reckert et al.

(10) Patent No.: US 7,222,563 B2
(45) Date of Patent: May 29, 2007

(54) STEAM GENERATING ASSEMBLY

(75) Inventors: John Reckert, Cooper City, FL (US);
Jeff Cook, Coral Springs, FL (US);
Duane Crisp, Columbia City, IN (US);
Terry Peter, Pembroke Pines, FL (US);
Rhonda Sward, Miami, FL (US);
Robert Wenzel, Port Richey, FL (US)

(73) Assignee: Burger King Corporation, Miami, FL (US)

( * ) Notice: Subject to any disclaimer, the term of this patent is extended or adjusted under 35 U.S.C. 154(b) by 18 days.

(21) Appl. No.: 10/372,412

(22) Filed: Feb. 24, 2003

(65) Prior Publication Data

US 2004/0166217 A1 Aug. 26, 2004

(51) Int. Cl.
*A47J 27/04* (2006.01)
*A47J 37/12* (2006.01)
(52) U.S. Cl. .............................. 99/330; 99/416; 99/417
(58) Field of Classification Search ................ 426/511, 426/331, 416; 99/330, 416, 417, 516; 219/409
See application file for complete search history.

(56) References Cited

U.S. PATENT DOCUMENTS

| 2,253,154 | A | * | 8/1941 | Tuttle .......................... 392/403 |
| 2,827,541 | A | * | 3/1958 | Baldwin ....................... 99/343 |
| 4,281,636 | A | * | 8/1981 | Vegh et al. ................... 126/369 |
| 6,516,709 | B1 | * | 2/2003 | Lin .............................. 99/331 |
| 2003/0024922 | A1 | * | 2/2003 | Stanger et al. ........... 219/449.1 |

* cited by examiner

*Primary Examiner*—Arthur L. Corbin
(74) *Attorney, Agent, or Firm*—Frommer Lawrence & Haug LLP (57) ABSTRACT

The steam generating assembly of the present invention subjects a food product, such as a sandwich bun, to a controlled burst of low pressure steam in order to quickly and uniformly raise the temperature of the food product to its desired serving temperature or higher. By raising the temperature to above the desired serving temperature, the storage time of a pre-assembled food product, such as a fast food sandwich may be extended without sacrificing the quality or freshness of the product. The invention claims a steam generating assembly for steam heating a pre-processed food product. The steam generating assembly is comprised of a steam module housing including a supply source, a steam generating heating element provided in the steam module housing, a target area in fluid communication with said steam generating heating element over which the food product may be positioned, and an actuation switch for initiating a steam delivery cycle wherein steam is released from the steam generating heating element through said target area to heat the food product.

30 Claims, 7 Drawing Sheets

STEAM GENERATING ASSEMBLY

BACKGROUND OF THE INVENTION

1. Field of the Invention

The invention relates to the field of food preparation. More particularly, the invention relates to a steam heating device and a method for its use that heats pre-processed food products to a desired temperature using controlled bursts of steam. The invention is particularly suited for use in a fast food restaurant, although it may find use in any restaurant or kitchen setting.

2. Description of the Related Art

The use of microwave ovens, food holding cabinets, and product holding units to heat and/or maintain at desired temperature levels pre-processed food products is well known in the fast-food restaurant art. The use of steam to heat and cook food products is also well known. In addition to the pressure cooker, which utilizes steam created under pressure to decrease cooking time, steam is used, for example, to heat food products in steam tables, and in steam enclosures. The prior-art heating devices and methods, however, suffer from a variety of drawbacks. It has been observed in consumer preference studies that food products heated by microwave may not be perceived as being fresh. Particularly with respect to baked goods such as sandwich buns and other pre-processed bread products, microwave heating may lead to an undesirable, soggy, or stale taste and texture. Additionally, food products heated in a microwave are not heated uniformly—resulting in hot and cold spots.

Other prior-art heating devices are deficient because they do not raise the temperature of the sandwich fast enough, do not have the necessary speed or ease of operation for the fast-food industry, or are cost prohibitive for a franchise-based business model. Of the commercially available heating devices examined, heated contact plates that provide conductive heat to the sandwich do not raise sandwich temperatures fast enough. Also the use of such plates on an assembly board in the fast paced environment of a fast-food kitchen are impractical. Convection based heating devices also do not raise the sandwich temperature fast enough and negatively affect sandwich quality. Infrared or lightwave heaters again do not raise the sandwich temperature to the desired level and are cost prohibitive. Conventional steam cabinets do not provide the needed product quality nor do they have the required speed or ease of operation.

The use of steam as a means of heating, while known, has heretofore not provided satisfactorily uniform results, particularly with respect to heating pre-processed food products such as baked goods, which may become soggy when exposed to a humid, steam environment. In prior-art steamers as well as in food holding cabinets using convective heating, it is difficult to control or maintain humidity at a desired level. Conventional steam cabinets also typically required time periods on the order of minutes to heat baked goods to temperatures in excess of 180° F. Moreover, since these steamers and ovens typically have relatively large sliding or hinged doors to load food products therein and remove the food products therefrom, heat and humidity escape from the unit. Additionally, these doors introduce inefficient employee movement and wasted labor by the constant opening and closing of the doors during the assembly process of a sandwich. And, such cabinets must be placed above or beside the sandwich assembly board—introducing even more inefficiency and wasted movement.

It is also well known in the fast-food art to prepare sandwiches utilizing a division of labor. Ordinarily one employee at an assembly station prepares part of a fast food sandwich and then hands the sandwich to a second employee who adds additional ingredients to the sandwich. This process is often repeated as necessary to assemble and wrap a complete sandwich ready for the consumer. This division of labor divides the product to be assembled between employees, (e.g. one employee assembles bun heels and meat patties while another prepares bun crowns and garnish) rather than dividing the equipment used in assembling the sandwich between employees.

The positioning of holding cabinets and microwaves around the assembly area has previously limited the assembly of fast food sandwiches to a method using a division of labor wherein the product to be assembled is divided between different employees positioned in front of the necessary holding cabinets, steam cabinets and/or microwaves and the various sandwich ingredients. Alternatively one employee would have to move down the length of the assembly board to assemble one sandwich. Whether utilizing a division of labor or a single employee walking the length of the board, the prior arrangement of holding cabinets, steam cabinets, and microwaves was plagued by inherent inefficiencies in assembling each sandwich, limited the available methods used to assemble sandwiches, and restricted menu options.

Sandwich assembly efficiency studies show that the most efficient method of assembling a sandwich divides the assembly process without dividing the product to be assembled. Prior art methods utilizing a division of labor that divides sandwich assembly between different employees yield a process that is 30–40% more efficient than one employee making the entire sandwich. Two employees making two sandwiches wherein each employee is positioned at his or her own individual workstation, nearly doubles the sandwich assembly efficiency and productivity.

Individual workstations, however, have not been incorporated in previous kitchen arrangements because of the related increase in cost and space. Sharing certain equipment, such as the steam heating device of the present invention, between employees without dividing the actual product to be assembled between multiple employees yields nearly 90% of the efficiency and productivity of individual workstations without the drawbacks of cost and space.

Consumer studies indicate that the average customer in a fast-food restaurant begins eating a fast-food sandwich approximately 2 to 3 minutes after purchase. But the average drive-through customer begins eating a fast-food sandwich approximately 7 minutes after purchasing a fast-food sandwich at the drive-through window. Consumer preference studies also show that customers prefer a fast-food sandwich when served at a temperature between the range of 150° F. to 160° F. Prior-art practices of cooking, heating, assembling, storing, and serving a sandwich have not been successful in maintaining a fresh tasting sandwich, within the desired serving temperature range of 150° F. to 160° F., for the range of time in which a consumer begins eating the sandwich, e.g. between approximately 2 to 7 minutes after purchase. In prior art practices, to maintain this temperature, the quality of condiments and garnish was sacrificed, as condiment temperatures often reached 115° F., rather than the customer preferred temperature range of approximately 90° F. to 100° F.

OBJECTS OF THE INVENTION

The foregoing demonstrates the need for a device and method for uniformly, rapidly, and easily heating a pre-processed food product, such as a sandwich bun, while maintaining product quality, a fresh taste, and uniformity between batches of products. Such device and method must be easy to use and have an associated cost that allows for its installation and incorporation into existing fast-food restaurants. Therefore, it is an object of the invention to provide a heating device for use in a fast-food restaurant that avoids the aforementioned deficiencies of the prior art.

It is also an object of the invention to provide a device for quickly heating a food product by means other than microwave heating while providing uniform heating throughout the desired food product.

It is yet another object of the invention to provide a heating device for use in a fast-food restaurant that is easy to use and reduces labor costs and food product preparation and assembly time.

It is still another object of this invention to provide a heating device for heating pre-processed food products to a temperature above the desired serving temperature without sacrificing product quality in order to ensure the fast-food sandwich is later served in customer-preferred temperature ranges.

Yet another object of the invention is to provide a means of rapidly heating baked goods, such as a sandwich bun, while maintaining a desired fresh bread quality and consistent texture.

It is yet a further object of the invention to provide a method for using a device for heating a food product that allows for increased efficiency and productivity in assembling fast-food sandwiches while avoiding the prohibitive cost and space requirements of individual workstations and the inefficiencies of dividing the assembly of one sandwich between multiple employees.

Various other objects, advantages and features of the present invention will become readily apparent from the ensuing detailed description and the novel features will be particularly pointed out in the appended claims.

SUMMARY OF THE INVENTION

The steam heating device of the present invention satisfies the need and avoids the drawbacks of the prior art by eliminating or minimizing the use of a microwave in food preparation and provides for more flexible, efficient, and productive assembly processes. In use, the steam generating assembly of the present invention subjects a food product, such as a sandwich bun, to a controlled burst of steam in order to quickly and uniformly raise the temperature of the food product to its desired serving temperature or higher. By raising the temperature to above the desired serving temperature, the storage time of a pre-assembled food product, such as a fast food sandwich may be extended to 10 minutes or more while ensuring a desired serving temperature in the range of 150° F. to 160° F., without sacrificing the quality or freshness of the product.

The steam generating assembly satisfies the need and avoids the drawbacks of the prior art by rapidly and uniformly heating a food product while maintaining the desired fresh, quality taste. The invention may be placed in a food product assembly line and used to heat or boost the temperature of sandwich components (e.g. a sandwich bun) more rapidly and uniformly than previously accomplished with a microwave oven, without raising the desired temperature of other sandwich components (e.g. garnish and condiments).

One particular embodiment of the invention includes a steam module housing, a steam generating heating element, a target surface covering the heating element, the target surface having a plurality of steam releasing perforations, and an actuation switch.

In a method according to the invention, the steam generating assembly may be used to rapidly and uniformly boost the temperature of a food product and thereby reduce overall product assembly time, while maintaining a fresh, quality tasting product. An alternate method allows two or more employees to assemble two or more, individual food products, such as fast food sandwiches, sharing only the use of the steam generating assembly. This avoids the drawbacks of the former practices of dividing the assembly of one product between multiple employees, or individual employees assembling products at individual workstations.

BRIEF DESCRIPTION OF THE DRAWINGS

The following detailed description given by way of example, but not intended to limit the invention solely to the specific embodiments described, may best be understood in conjunction with the accompanying drawings in which.

DETAILED DESCRIPTION OF CERTAIN PREFERRED EMBODIMENTS

Referring now to FIGS. 1 through 9, wherein like reference numerals represent like features in the several views, a steam generating assembly 100 is illustrated in accordance with the teachings of the invention. In one embodiment, steam generating assembly 100 includes steam module housing 110, supply source 120, heat shield 130, perforated target area(s) 140, actuation button(s) 150 and a control module (not shown). Preferably, steam module housing 110 is configured to be mounted to a preparation board in the assembly line of a fast-food restaurant or other kitchen area. Steam generating assembly 100 may be mounted to the prep board in a kitchen area by mounting steam module housing 110 around the front edge of the prep board. The system is notched to allow control modules, water/steam supply, pumps, solenoids and the like to be housed underneath the front edge or lip of the prep board. In alternate embodiments, the system may have an adjustable notch to fit on different-sized assembly boards.

Steam module housing 110 is connected to water feed 125 and power supply 126. Water feed 125 is preferably connected to supply source 120 via a passage or tube 129 through steam module housing 110. Water feed 125 is preferably composed of food grade hose and may be fed by either a remote pump module 200 (see FIG. 6), water regulator or a direct water line hook-up. An alternate embodiment incorporating a direct water line hook-up for the water feed 125 may also incorporate a regulator or other means of controlling water pressure.

In a preferred embodiment, steam is generated when water is released at supply source 120 onto a heated steam generator surface 127. More preferably water from water feed 125 is sprayed through supply source 120 onto heated steam generator surface 127 producing low pressure steam. Water feed 125 delivers an adjustable volume of water, preferably from 3 to 8 grams, and most preferably 4.5 grams, to steam generator surface 127. Water is delivered to the steam generator surface 127 over a period of time, preferably 0.4 seconds for 4.5 grams of water, such that the water flashes to steam and the steam is delivered at low pressure to the food product within approximately 5 seconds after activation. In order to flash the preferred quantity of water into steam in the preferred time period, steam generator surface 127 is adjustably set to preferably reach a temperature of between approximately 280° F. and 360° F.

In an alternate embodiment, the volume of water can be adjusted to predetermined amounts to deliver greater or lesser quantities of steam over various predetermined time periods, thus allowing for product flexibility. For example, if egg products are to be steamed, a switch would preferably release 9 grams of water from water feed 125 over 0.8 seconds to the steam generator surface 127 yielding 10 seconds of steam to the egg products. The switch could then be reset to deliver the preferred 4.5 grams of water from water feed 125 over 0.4 seconds to the steam generator surface 127, yielding 5 seconds of steam appropriate for bread products. In another alternate embodiment, steam may be generated remotely and delivered to supply source 120 via water feed 125.

Power supply 126 supplies electrical power, preferably 125 volt 60 hz, to generator surface 127 of steam module housing 120. In alternative embodiments of the invention, steam may be generated by any other conventional steam generating means. Steam generating assembly 100 may also be provided with on/off power switch 128 connected to power supply 126. Power switch 128 preferably includes a ready indicating light, indicating operational readiness.

In a preferred use, an adjustable amount of water is controllably released through supply source 120 onto steam generator surface 127, thus producing an adjustable, controlled release of steam to target area 140 over a period preferably between the range of 3 to 10 seconds, most preferably 5 seconds. Target area 140 contains a plurality of perforations, such as 141*a* and 141*b*, of a sufficient predetermined pattern and size through which steam is delivered at low pressure via atmospheric up-shoot to a desired food product. The desired food product is heated by convection and conduction of the steam. The dimensions and arrangement of target area 140 and perforations 141 in the preferred embodiment maximize available steam area to a 4 inch bun while also effectively steaming a 5 inch bun. In order to deliver steam uniformly to the desired food product, perforations 141 should be evenly spaced and distributed on the target area 140. The total area of the perforations 141 should be approximately in the range of 25% to 45% of the surface area of the bun surface in contact with target area 140.

Figure 7A:
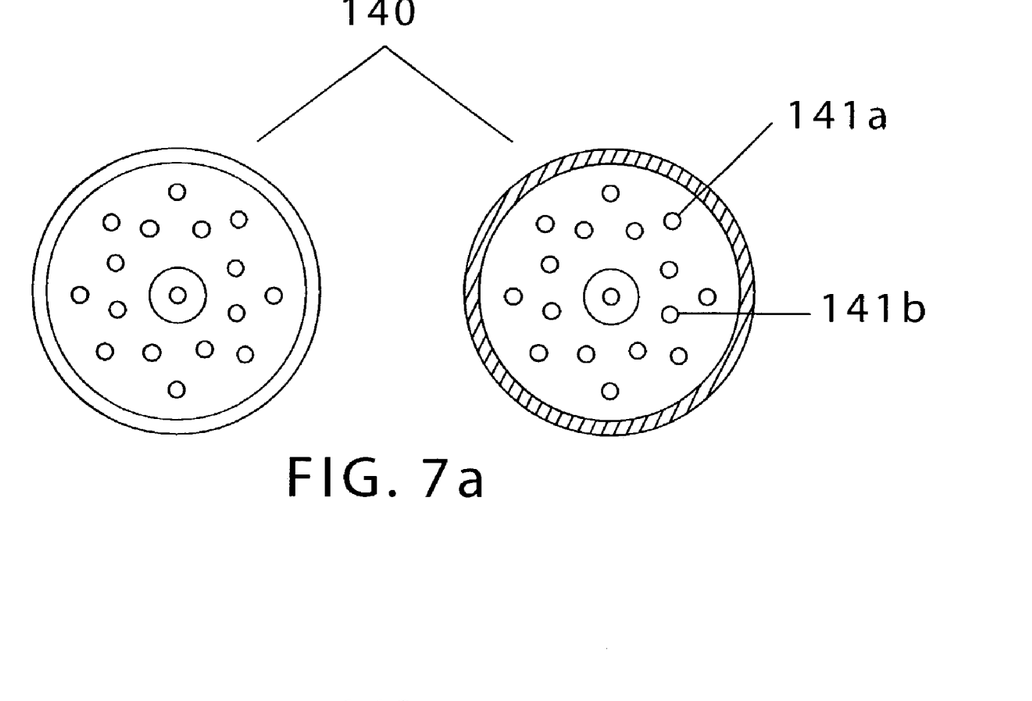
FIG. 7A is a top plan view of a preferred embodiment of the perforated target areas which can be used in conjunction with the steam generating assemblies of FIGS. 1 and 6.
Figure 7B:
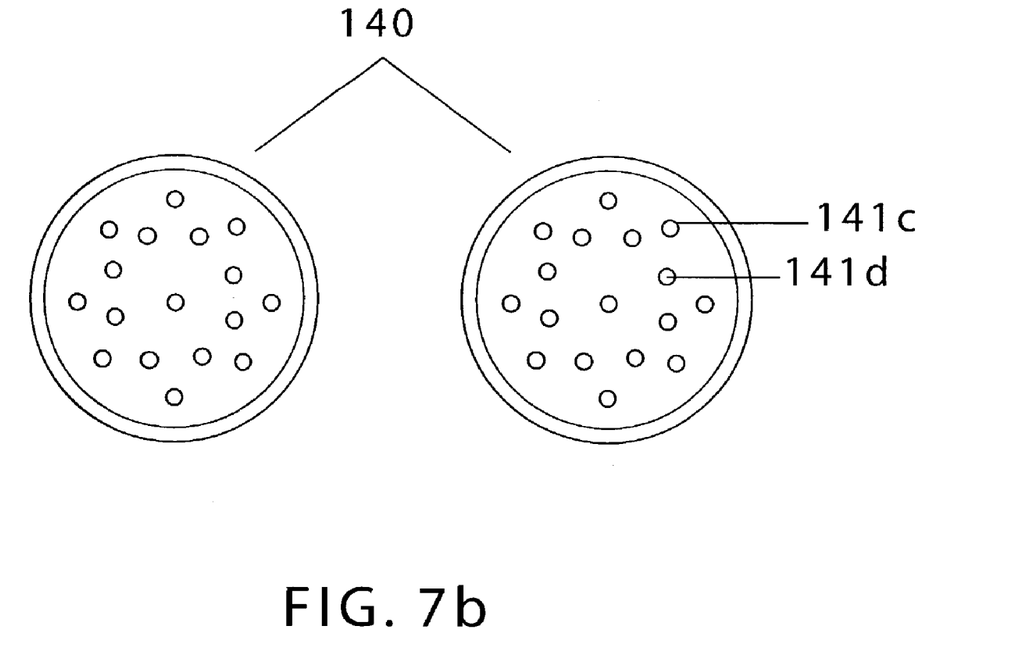
FIG. 7B is a bottom view of the target areas of FIG. 7A.

Referring to FIG. 7*a*, in a preferred embodiment, target area 140 is approximately 3.5 inches in diameter and preferably includes inner and outer concentric circles 141*a* and 141*b* of at least 8 evenly spaced perforations 141 each (see FIG. 3), wherein perforations 141 are preferably 5/16 inch in diameter. Referring to FIG. 7*b*, in an alternate embodiment a random arrangement of evenly spaced perforations 141*c* and 141*d* may be used. In a further alternate embodiment, a grid pattern of perforations may be used. The diameter of individual perforations 141 may vary between perforations 141, as may the pattern of distribution of perforations 141 so long as uniform heating of a sandwich bun or other food product is achieved.

Target area 140 is also preferably sized to prevent accidental operator contact with target area 140, and is ideally sized so that the desired food product (e.g. a sandwich bun) to be steam heated overlaps target area 140. The surface of target area 140 should also preferably be raised above the surface of heat shield 130 such that the portion of the food product that overlaps target area 140 is not in contact with heat shield 130. Further to achieve a safe and easy system to operate, target area 140 and heat shield 130 are preferably made from a high temperature resistant, food grade material of low conductivity, such as ULTEM, to minimize residual heat after use and prevent burning the operator. Preferably for reasons of safety, no surface of steam generating assembly 100 in contact with the operator should exceed 140° F.

Figure 8:
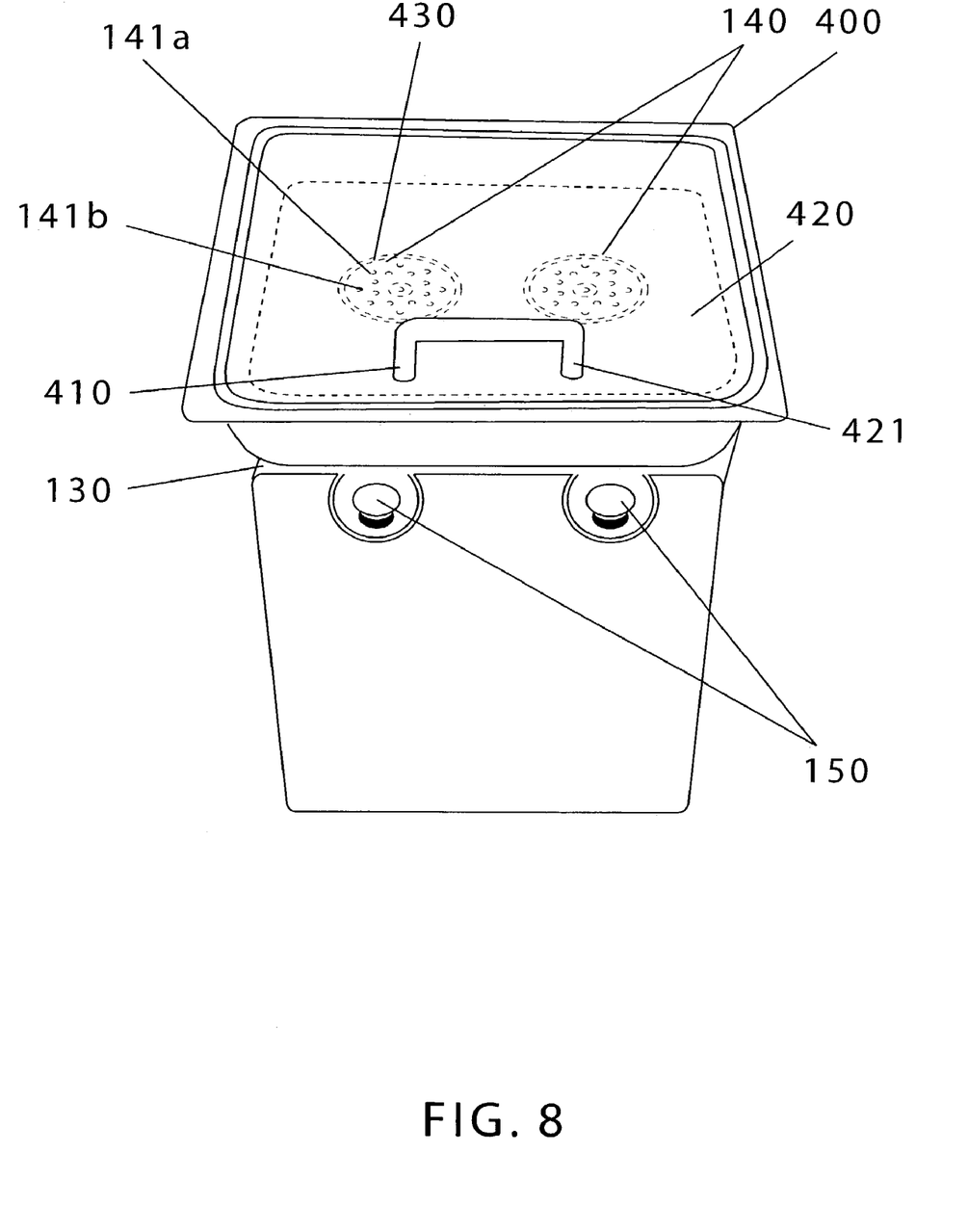
FIG. 8 is a perspective view of another preferred embodiment of a steam generating assembly in accordance with the present invention with an egg product adapter attached.
Figure 9:
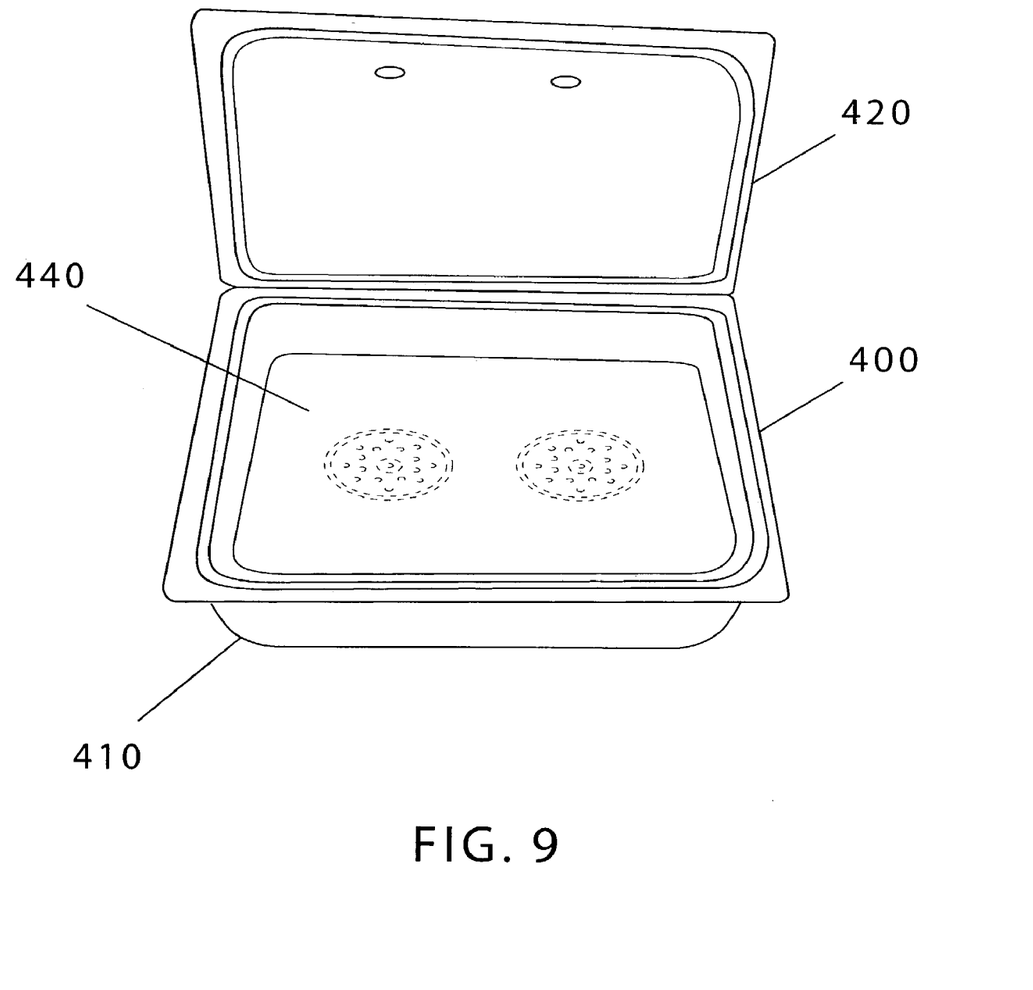
FIG. 9 is a perspective view of the egg product adapter of FIG. 8 with the cover lifted upwardly.

In an alternate embodiment, as shown in FIG. 8, heat shield 130 may be removed from steam module housing 110 and replaced with product adapter compartment 400 for heating batches of egg products and the like. Target areas 140 are preferably the same as those described in FIG. 7. Product adapter compartment 400 preferably includes housing 410, housing lid 420, housing lid handle 421, target area cutouts 430, and heat conductive plate 440. Housing lid 420 is preferably sized and shaped such that a minimal amount of steam escapes from housing 410 to the kitchen environment when housing lid 420 is placed on product adapter 400 and steam heater 100 is actuated. Product adapter 400 is preferably sized and shaped to accept food product holding trays used in food product holding cabinets in a typical fast-food kitchen. Food products, such as batches of egg products, are cooked by conduction and convection when steam is released through perforations 141 as previously described and the steam is contained in the closed egg product adapter 400.

Actuation button(s) 150 control(s) the delivery of water or steam to steam source 120. In one embodiment, the delivery of steam to each target area 140 is initiated by its own actuation button 150. In another embodiment, one actuation button 150 may initiate the delivery of steam to more than one target area 140. Most preferably, actuation buttons 150 are configured so that steam is not delivered to target areas not in use in order to limit the amount of residual steam released and minimize the risk of burns to the operator. In an alternative embodiment, actuation button(s) 150 may be connected to or replaced by alternate actuation means including a foot switch, hip switch, etc., or the delivery of water or steam may be automatically actuated by the presence of the food product on target area 140. Actuation button 150 may be connected to a ready indicating light and/or audible signal to indicate steam cycle readiness.

A control module (not shown) adjustably controls various functions that support steam generating assembly 100 including, e.g., timing cycle, water volume delivery, generator surface temperature. Steam generating assembly 100 may also be provided with audio and/or visual indicators to signal unit readiness, end of the steam delivery cycle, steam cycle readiness, etc. The control module is preferably set so that, under normal operation, no residual steam is emitted from steam generating assembly 100 three seconds after the end of the steam delivery cycle. The recovery time of steam generating assembly 100 is preferably set to allow for a new cycle within five seconds after completion of the previous cycle. Most preferably, steam generating assembly 100 is set to be at temperature and ready to function correctly after 20 consecutive cycles 8 seconds apart.

Figure 1:
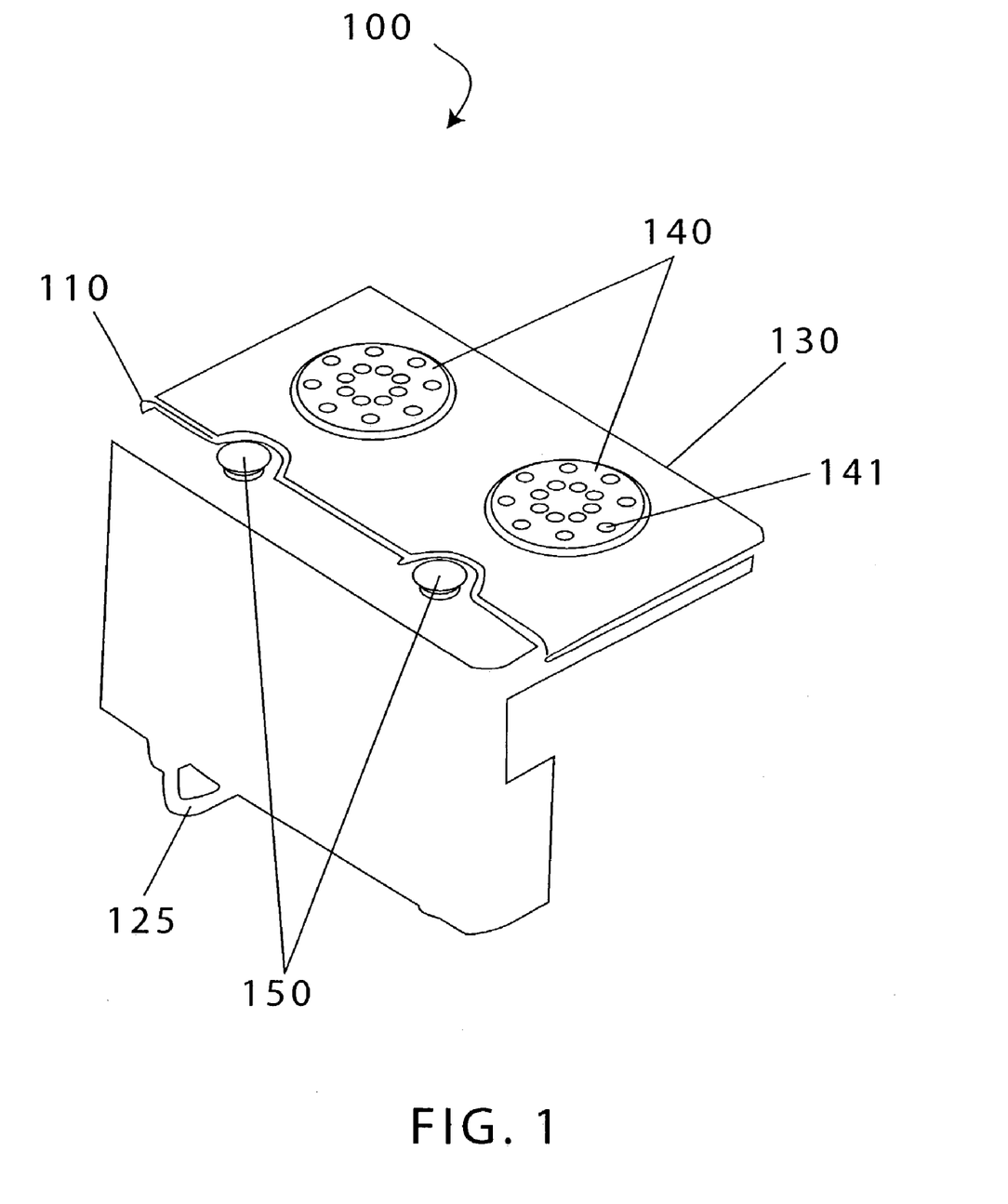
FIG. 1 is a front perspective view of a preferred embodiment of a steam generating assembly in accordance with the teachings of the present invention.
Figure 2:
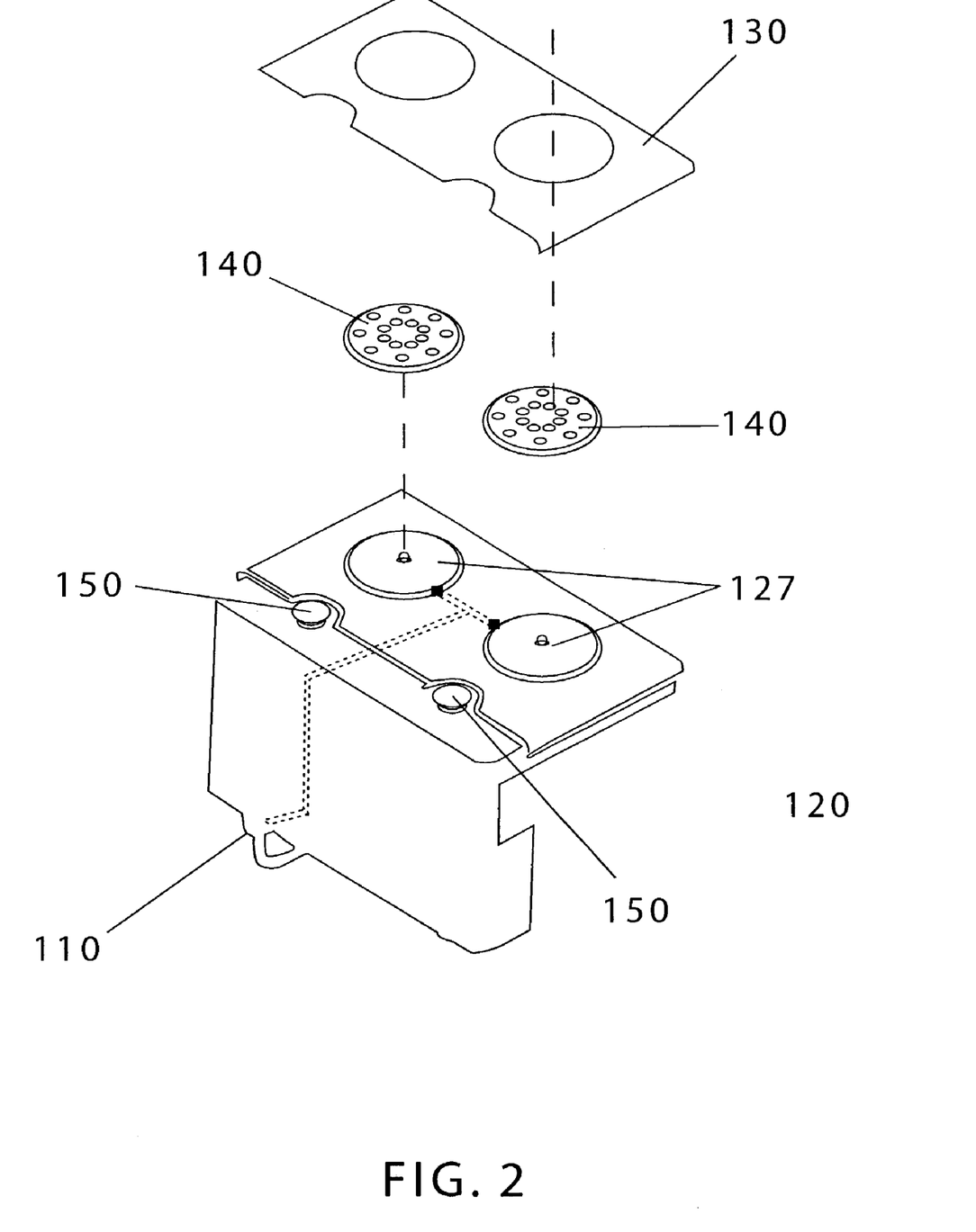
FIG. 2 is an exploded view of the steam generating assembly of FIG. 1.
Figure 3:
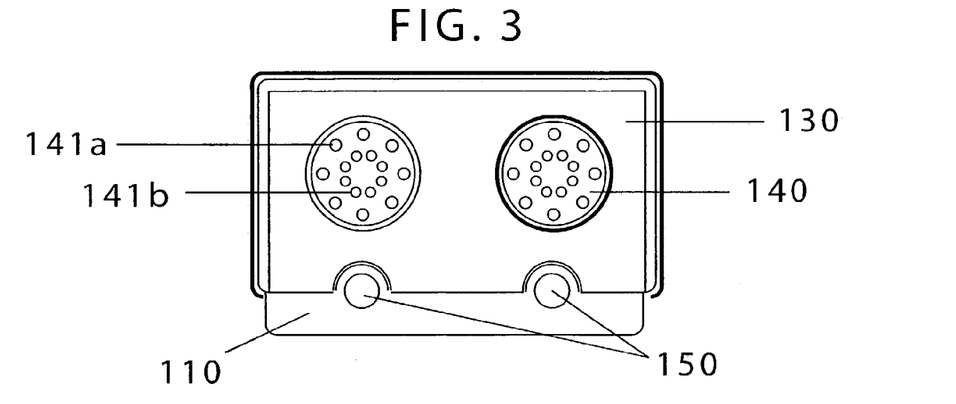
FIG. 3 is a top plan view of the steam generating assembly of FIG. 1.
Figure 4:
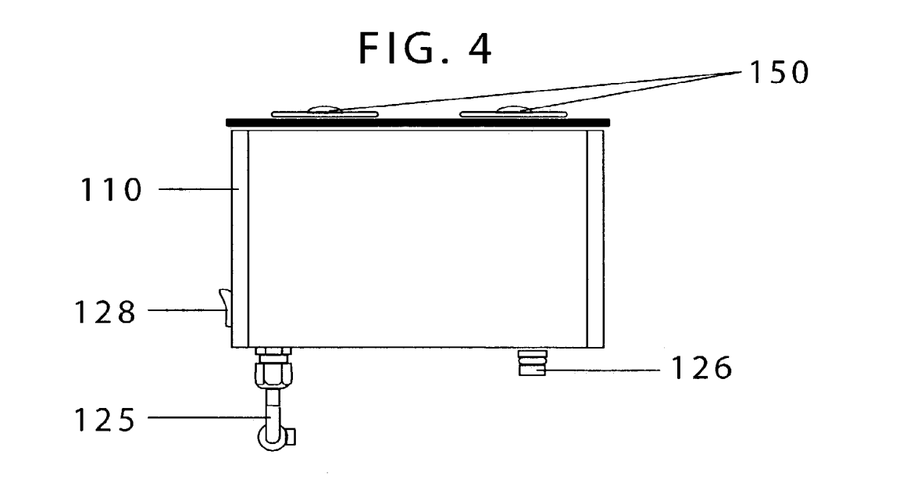
FIG. 4 is front elevation view of the steam generating assembly of FIG. 1.
Figure 5:
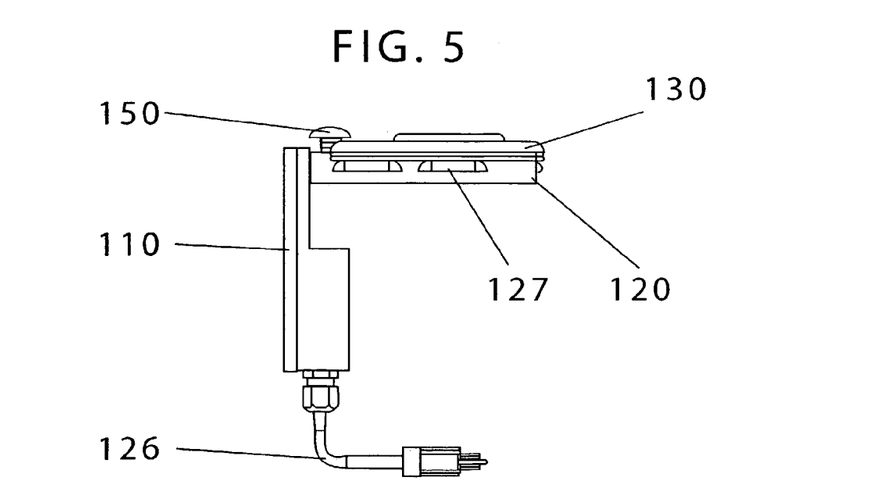
FIG. 5 is a side elevation view of the steam generating assembly of FIG. 1.
Figure 6:
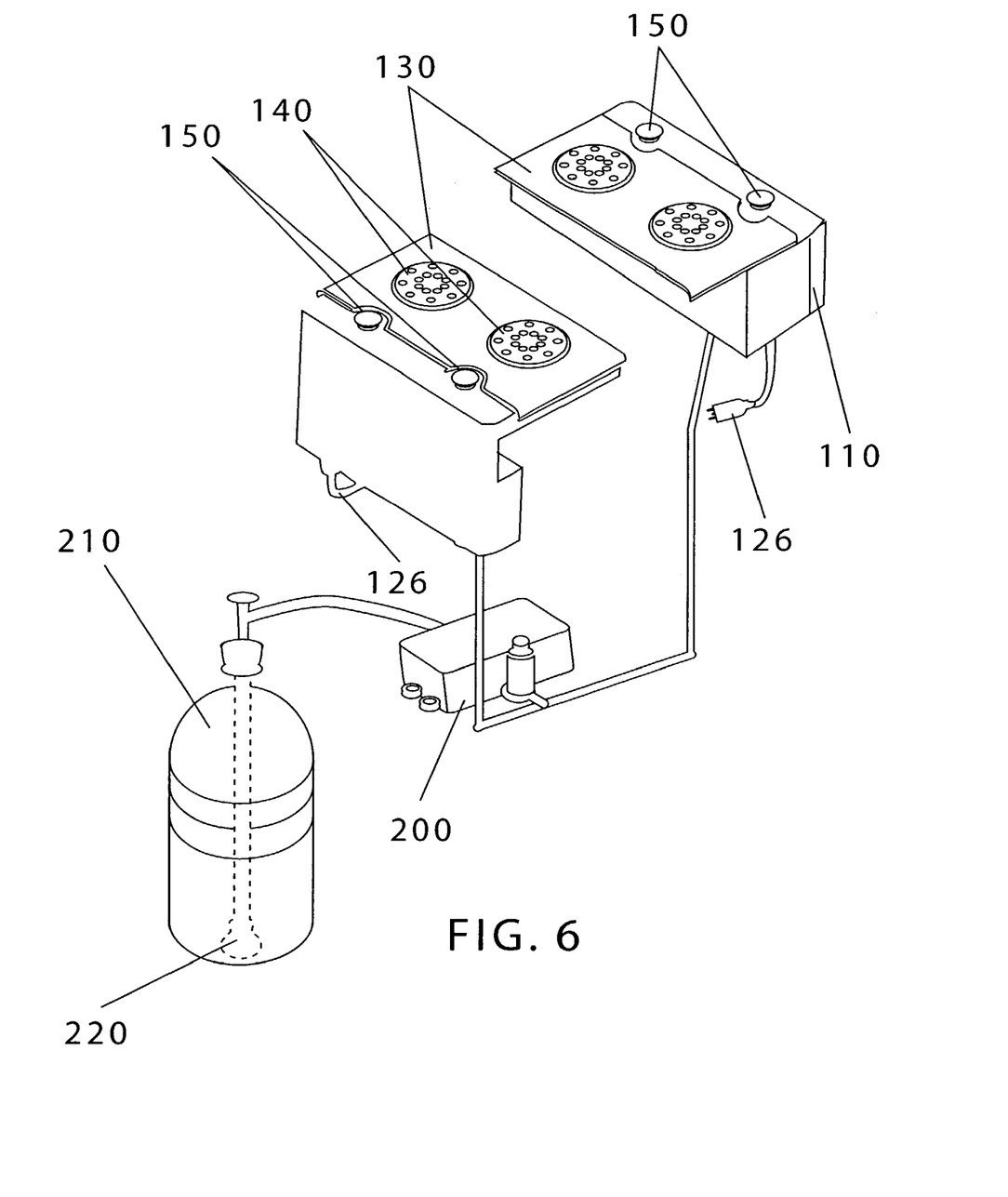
FIG. 6 is a perspective view of a preferred embodiment of two steam generating assemblies constructed in accordance with the teachings of the present invention and connected to a water supply.

In a preferred embodiment shown in FIG. 6, two steam generating assemblies 100 are connected to pump module 200. Pump module 200 is fluidly connected to water source 210 via pump supply 220 or connected to existing water source. Preferably, each steam generating assembly 100 has its own power on/off switch 128.

In a method according to the invention, the steam generating assembly 100 may be used in the preparation of fast food sandwiches such as hamburgers, breakfast sandwiches, hot sandwiches, and the like to be served at preferred temperatures ranging from 150° F. to 160° F. Use of the steam generating assembly 100 reduces sandwich assembly times over conventional microwave processes, improves product quality, and leads to increased customer satisfaction.

In a preferred method of heating a food product (e.g. a bun half), an employee places the food product to be heated on target area 140 of steam generating assembly 100. Depressing actuation button 150 releases a controlled quantity of steam through perforations 141, thereby rapidly heating the product by exposure to the steam. Unlike prior-art microwave heating, exposure to steam through the perforations 141 of target area 140 leads to uniform heating of the entire exposed surface of the pre-processed food product.

In a preferred method of use, the heel of a sandwich bun is heated from a temperature of about 130° F. to a temperature of about 190° F. in a period of approximately 5 seconds with low-pressure steam. By quickly raising the temperature to above the desired serving temperature range of between 150° F. to 160° F., the bun half retains its temperature enough to keep the average overall serving temperature of the sandwich in the range of approximately 150° F. to 160° F. While the bun heel is steamed, preferably by placement on the steam generating assembly 100 cut side down, an employee operating the steam generating assembly 100 preferably completes the assembly of the remaining ingredients on the other half of the sandwich bun, (e.g. the crown of the sandwich bun plus condiments, garnish, etc.). When the steaming cycle is complete, the employee finishes the sandwich assembly by adding, for example, meat, cheese, etc. to the heel and then closing sandwich with the pre-assembled crown, and then wrapping the sandwich in foil, paper, etc. In a preferred method, the time required to assemble the remaining sandwich ingredients while the bun heel is being steamed should exceed the time set to steam the bun heel. This ensures that the employee will not pick the bun heel off the steam generating assembly while the bun heel is still being steamed. The preferred method of use decreases sandwich assembly times over the prior art and provides for a uniformly heated sandwich that will maintain its serving temperature in the preferred range of 150° F. to 160° F. for at least 10 minutes after assembly is completed. Preferably, a broiled product is placed directly on the steam heated bun heel, thereby ensuring that the majority of the heat from the bun is transferred to the broiled product placed on top of the steam heated bun instead of to the condiments, which lay on top of the broiled product. The broiled product serves as a thermal barrier between the heated bun heel and the top or crown portion of the sandwich. This ensures the overall sandwich serving temperature is maintained in the preferred range of 150° F. to 160° F. over a period of 10 minutes or more while the condiment temperature does not exceed 105° F. in the same time period.

In another preferred method of use, multi-ingredient, heated, fast-food sandwiches are prepared by a first and second employee working at a first and second sandwich assembly station respectively. The first and second sandwich assembly stations are located on either side of a steam generating assembly. Sandwich ingredients are provided at each sandwich assembly station. The method begins when a first employee places a first and second sandwich bun heal on the steam generating assembly, hands the second sandwich bun crown to a second employee at the second sandwich assembly station, and keeps the first sandwich bun crown at the first sandwich assembly station. The first employee then actuates the steam heating assembly. The first and second employees then assemble their respective sandwich bun crowns as described above. When the first and second sandwich bun heals are heated to the desired temperatures and steaming is complete, the first and second employees remove the first and second bun heals from the steam heating assembly and assemble their respective sandwiches as previously described. The first employee then places his fully assembled and wrapped sandwich adjacent to the second sandwich assembly station so that the second employee can transfer both the first and second fully assembled sandwiches to a sandwich holding station.

Accordingly, for those reasons set forth above, the present invention provides a cost effective, easily installed device and method for rapidly and uniformly heating a pre-assembled fast-food product to temperatures above the desired serving temperature of between the range of approximately 150° F. to 160° F., while maintaining product quality, a consistent fresh taste and uniformity between batches. The present invention also provides significant advantages in product assembly efficiency, productivity, and product flexibility over the prior art.

Although the invention has been particularly shown and described with reference to certain preferred embodiments, it will be readily appreciated by those of ordinary skill in the art that various changes and modifications may be made therein, without departing from the spirit and scope of the invention. It is intended that the claims be interpreted as including the foregoing as well as various other such changes and modifications.

What is claimed is:

1. A steam generating assembly for steam heating a pre-processed food product comprising:
   a steam module housing including a supply source;
   a steam generating heating element provided in the steam module housing;
   a substantially non-heat-conductive target area in fluid communication with said steam generating heating element over which the food product may be positioned;
   a substantially non-heat-conductive heat shield disposed on a top surface of said steam module housing, wherein said heat shield surrounds said target area;
   a control module for adjustably controlling steam generation functions; and
   an actuation switch for initiating a steam delivery cycle wherein steam is released from the steam generating heating element through said target area to heat the food product.

2. The steam generating assembly of claim 1 wherein said target area has a plurality of perforations.

3. The steam generating assembly of claim 2 wherein said perforations are arranged in concentric circles.

4. The steam generating assembly of claim 2 capable of delivering low pressure steam through said perforations.

5. The steam generating assembly of claim 1 capable of generating steam in situ proximate said target area by said steam generating heating element.

6. The steam generating assembly of claim 1 wherein said steam generating heating element is capable of operating within the temperature range of between approximately 280° F. to 360° F.

7. The steam generating assembly of claim 1 wherein said control module further comprises a steam cycle switch for adjustably controlling the time to complete each steam generating cycle.

8. The steam generating assembly of claim 1 wherein said control module further comprises a steam cycle switch for adjustably controlling the amount of steam generated by said steam generating heating element.

9. The steam generating assembly of claim 1 further comprising a power switch for turning on/off the steam source.

10. The steam generating assembly of claim 1 further comprising an indication means for indicating steam cycle readiness of the steam generating assembly.

11. The steam generating assembly of claim 1 wherein said steam module housing is configurably mountable to a preparation board in an assembly line of a fast-food restaurant.

12. The steam generating assembly of claim 11 wherein said steam module housing is notched.

13. The steam generating assembly of claim 1 further comprising a water supply and water regulator fluidly connected to said steam generating heating element.

14. The steam generating assembly of claim 1 further comprising a nozzle to spray water over said steam generating heating element.

15. The steam generating assembly of claim 1 wherein said water regulator is fluidly connected to two or more steam generating heating elements.

16. The steam generating assembly of claim 1 further comprising:
   a product adapter compartment configured to receive food product holding trays and removably mountable with respect to said steam module housing, said compartment further comprising;
   a substantially horizontal bottom plate having at least one target area cutout for receiving said target area to allow the passage of steam from said target area into said compartment; and
   a conductive heat plate positioned at the bottom of said compartment above said substantially horizontal bottom plate.

17. A steam generating assembly for steam heating pre-processed food products comprising:
   a steam module housing;
   a plurality of steam generating heating elements;
   a plurality of substantially non-heat-conductive target areas each in fluid communication with at least one of said steam generating heating elements over which the food product may be positioned;
   a substantially non-heat-conductive heat shield disposed on a top surface of said steam module housing, wherein said heat shield surrounds said target areas;
   a control module for adjustably controlling steam generation functions;
   means for initiating a steam delivery cycle to at least one of said target areas so as to selectably heat the food product positioned over said target area.

18. The steam generating assembly of claim 17 wherein said means for initiating a steam delivery cycle initiates a steam delivery cycle to a plurality of target areas simultaneously.

19. The steam generating assembly of claim 17 wherein at least one of said target areas has a plurality of perforations.

20. The steam generating assembly of claim 19 wherein said perforations of said target area are arranged in concentric circles.

21. The steam generating assembly of claim 19 capable of delivering low pressure steam through said perforations.

22. The steam generating assembly of claim 17 capable of generating steam in situ proximate said target areas by at least one of said steam generating heating elements.

23. The steam generating assembly of claim 17 wherein at least one of said steam generating heating elements is capable of operating within the temperature range of between approximately 280° F. and 360° F.

24. The steam generating assembly of claim 17 wherein said control module further comprises a steam cycle switch for adjustably controlling the time required to complete each steam generating cycle.

25. The steam generating assembly of claim 17 wherein said control module further comprises a steam cycle switch for adjustably controlling the amount of steam generated at steam generating element.

26. The steam generating assembly of claim 17 further comprising a power switch for controlling power to each of the first and second steam generating elements.

27. The steam generating assembly of claim 17 further comprising indication means for indicating steam cycle readiness of the steam generating assembly.

28. The steam generating assembly of claim 17 wherein said steam module housing is configurably mountable to a preparation board in the assembly line of a fast-food restaurant.

29. The steam generating assembly of claim 28 wherein said steam module housing is notched.

30. The steam generating assembly of claim 17 further comprising:
   a compartment configured to receive food product holding trays and capable of attaching to said steam module housing, said compartment further comprising;
   a substantially horizontal bottom plate arranged to allow the passage of steam from said perforated target areas into said compartment; and
   a conductive heat plate positioned at the bottom of said compartment above said substantially horizontal bottom plate.

* * * * *